US008599137B2

(12) United States Patent  (10) Patent No.: US 8,599,137 B2
Rayner  (45) Date of Patent: Dec. 3, 2013

(54) NAVIGATION TOOL INCLUDING INDUCTION FUNCTIONALITY

(75) Inventor: Frederic Howard Rayner, Egham (GB)

(73) Assignee: BlackBerry Limited, Waterloo (CA)

( * ) Notice: Subject to any disclaimer, the term of this patent is extended or adjusted under 35 U.S.C. 154(b) by 789 days.

(21) Appl. No.: 12/630,124

(22) Filed: Dec. 3, 2009

(65) Prior Publication Data
US 2011/0134042 A1 Jun. 9, 2011

(51) Int. Cl.
*G06F 3/033* (2013.01)
(52) U.S. Cl.
USPC .................................................. 345/167
(58) Field of Classification Search
None
See application file for complete search history.

(56) References Cited

U.S. PATENT DOCUMENTS

| | | | |
|---|---|---|---|
| 5,838,138 A | 11/1998 | Henty | |
| 6,686,903 B1 | 2/2004 | Peng | |
| 2002/0118173 A1 | 8/2002 | Nacson | |
| 2003/0048092 A1* | 3/2003 | Chu | 320/107 |
| 2003/0095101 A1 | 5/2003 | Jou | |
| 2004/0174340 A1 | 9/2004 | Bruneau | |
| 2004/0196262 A1 | 10/2004 | Poltorak | |
| 2007/0040655 A1 | 2/2007 | Lee et al. | |
| 2007/0080946 A1 | 4/2007 | Fyke et al. | |
| 2007/0188471 A1 | 8/2007 | Mak-Fan et al. | |
| 2007/0259698 A1 | 11/2007 | Chen et al. | |
| 2007/0268256 A1 | 11/2007 | Mankaruse et al. | |
| 2008/0051041 A1 | 2/2008 | Griffin et al. | |
| 2008/0074392 A1 | 3/2008 | Mustafa et al. | |
| 2009/0023478 A1 | 1/2009 | Lowles et al. | |
| 2009/0104947 A1 | 4/2009 | Godston | |
| 2009/0160775 A1 | 6/2009 | Vanden Heuvel | |
| 2010/0253092 A1* | 10/2010 | Lai et al. | 290/1 R |

FOREIGN PATENT DOCUMENTS

| | | |
|---|---|---|
| EP | 2093649 | 8/2009 |
| GB | 2425003 | 10/2006 |
| JP | 10283079 A * | 10/1998 |

OTHER PUBLICATIONS

Vikash Kumar Sharma, "Roller Charger (Rolling Cells Can Be Fun!!)", online article, www.createthefuturecontest.com, Oct. 15, 2008.
European Search Report dated Jun. 4, 2010. In corresponding application 09177957.9.
Office Action mailed Apr. 15, 2013, in corresponding Canadian patent application No. 2,723,300.

* cited by examiner

*Primary Examiner* — Hoa T Nguyen
*Assistant Examiner* — Mark Fischer
(74) *Attorney, Agent, or Firm* — Novak Druce Connolly Bove + Quigg LLP; Timothy Clise

(57) ABSTRACT

There is provided a handheld electronic device including a support structure, a display, a navigation tool assembly and a coil. The display is located on a front face of the device and upon which graphical user interface information is displayed to the user of the device. The navigation tool assembly is coupled to the support structure and includes a navigation tool that is moveable relative to the support structure. The navigation tool is configured to control motion of a selection or position indicator on the display. The coil is coupled to the support structure. A movement of the navigation tool relative to the support structure effects induction of current through the coil.

21 Claims, 13 Drawing Sheets

NAVIGATION TOOL INCLUDING INDUCTION FUNCTIONALITY

FIELD OF THE APPLICATION

The present disclosure relates to navigation tools for electronic devices.

BACKGROUND

Power management can be an issue for portable electronic devices, such as handheld electronic communication devices, whose operation may be limited by the operational charge of its battery. It is becoming useful to scavenge energy in creative ways so as to reduce the frequency at which batteries must be replaced or recharged.

DETAILED DESCRIPTION

One aspect of the present description provides an electronic device comprising a navigation tool assembly coupled to a support structure and including a navigation tool that is moveable relative to the support structure; and a coil coupled to the support structure. A movement of the navigation tool relative to the support structure effects induction of current through the coil. The coil may include a plurality of windings.

Another aspect of the present disclosure provides a method for moving a navigation tool of an electronic device relative to a support structure of the device, and in response to said movement, inducing current through a coil coupled to the navigation tool. In response to the inducing, a battery of the device is charged.

In general, as used herein, the term "selection or position indicator" refers to a screen cursor, highlighting of a screen icon or text, backlighting or "framing" of a screen icon or text, or any other means by which a location of user interaction with the device 300 may be indicated.

Figure 1:
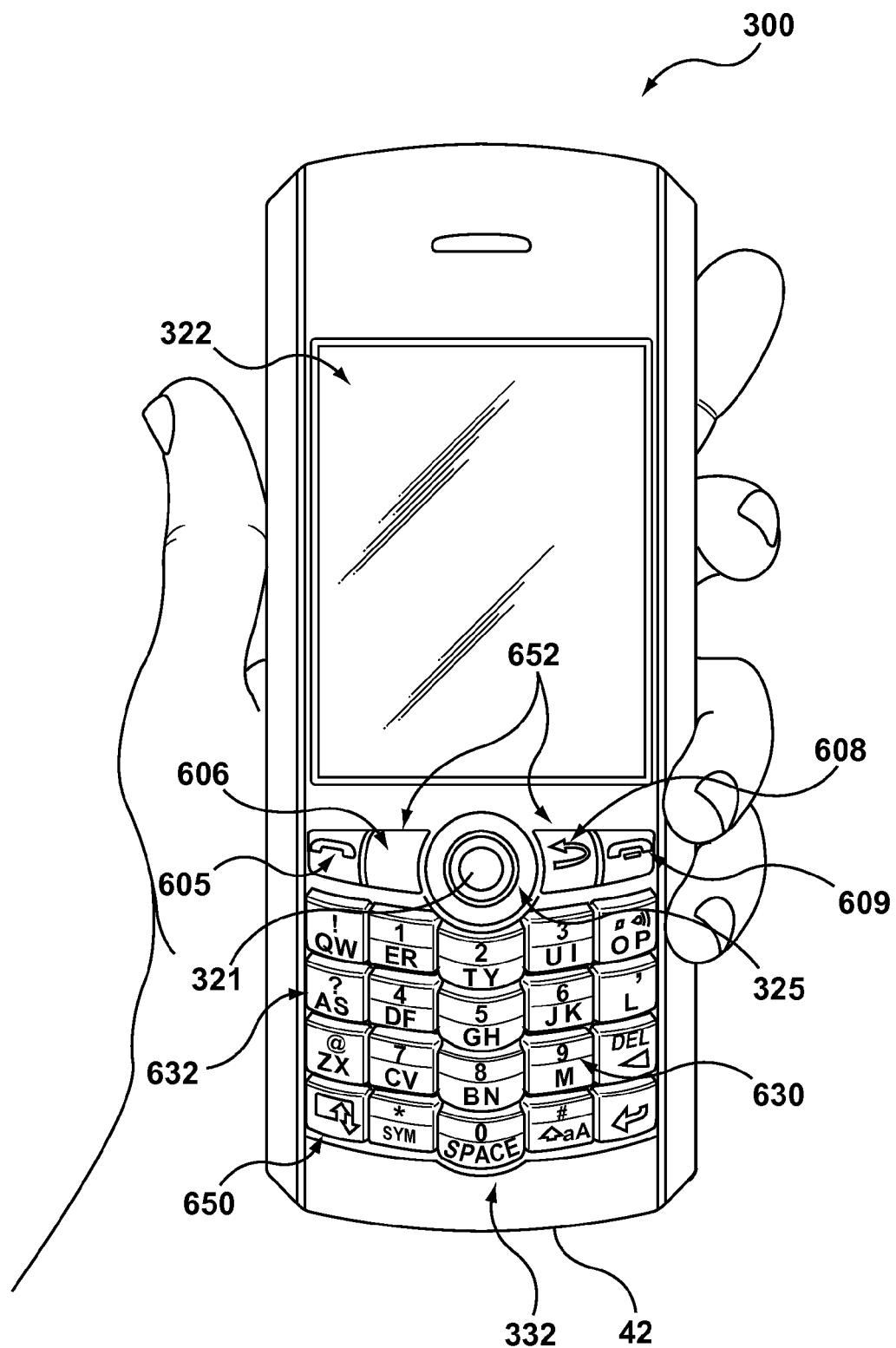
FIG. 1 illustrates a handheld electronic device configured to the present teachings and cradled in the palm of a user's hand.
Figure 2:
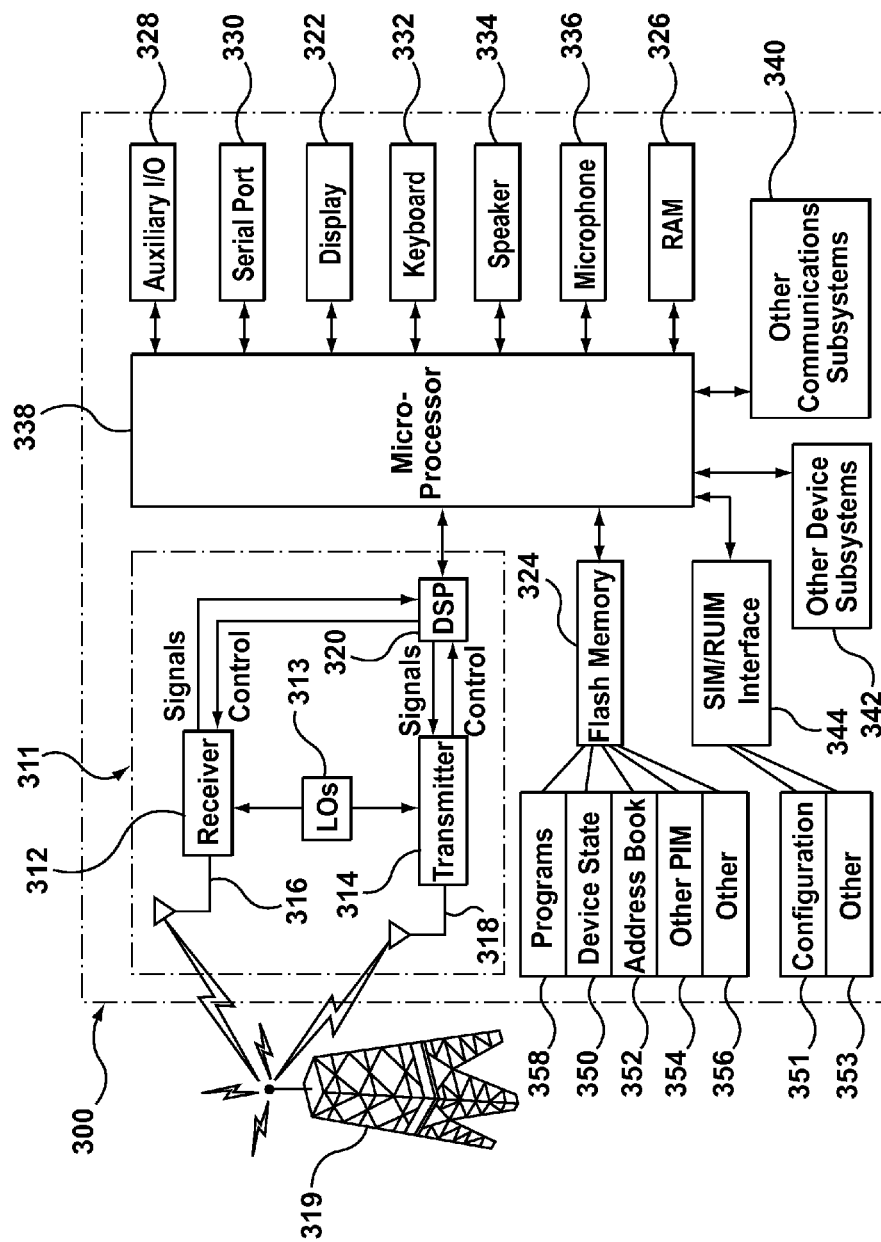
FIG. 2 is a block diagram representing the handheld electronic device interacting in a communication network.

In general, as used herein, the term "handheld electronic device" 300 describes a relatively small or portable electronic device that can be held in a user's hand. It is a broad term that includes handheld communication devices which interact with communication networks 319 (FIGS. 1 and 2). When cooperating in a communications network 319 as depicted in FIG. 2, the handheld electronic device 300 wirelessly transmits data to and receives data from a communication network 319 utilizing radio frequency signals. In some embodiments, the data transmitted between the handheld electronic device 300 and the communication network 319 supports voice and textual messaging. However, the present disclosure is not limited to handheld electronic devices, and can also be implemented on electronic devices such as laptop computers, personal computers, GPS systems, gaming consoles, and the like.

An exemplary embodiment of the handheld electronic device 300 (also referred to herein as "device 300") is shown in FIG. 1. In some embodiments, the handheld electronic device 300 is cradleable in the palm of a user's hand to thereby provide a hand cradleable electronic device. The size of the handheld electronic device 300 is such that a user is capable of operating the device using the same hand that is holding the device. In some embodiments, the user is capable of actuating features of the device 300 using the thumb of the cradling hand, while in other embodiments, features may require the use of more than just the thumb of the cradling hand. In order to accommodate palm-cradling of the device 300 by the average person, in some embodiments, the device is longer (height as shown in FIG. 1) than it is wide. In this respect, for example, the width is preferably between approximately fifty and seventy-six millimeters (two and three inches), but by no means limited to such dimensions.

Some embodiments of the handheld electronic device 300 include an input device 650 on the face of the device, which can be actuated by the thumb of the hand cradling the device. For some embodiments of the device 300, the user may also hold the device in such a manner to enable two-thumb typing on the device. For some embodiments of the device 300, the user may use fingers rather than thumbs to actuate the keys on the device.

As may be appreciated from FIG. 1, in some embodiments, the handheld electronic device 300 comprises a display 322 located above the input device 650 and which is suitable for accommodating textual input to the handheld electronic device 300 when in an operable configuration. In some embodiments, the input device 650 includes a keyboard 332. The keyboard 332 is suitable for accommodating input to the handheld electronic device 300 and includes any combination of menu keys 652, alphanumeric keys 630, alphabetic keys 632, numeric keys 42, and other function keys as shown in FIG. 1. In the illustrated embodiment, the device 300 is of unibody construction, also known as a "candy-bar" design, and it is also contemplated that the handheld electronic device 300 may be of an alternative construction such as that commonly known as "clamshell" or "flip-phone" style. It is understood that the device 300 is not limited to such constructions.

The handheld electronic device 300 further includes a navigation tool assembly 325. The navigation tool assembly 325 is provided to effect movement of the selection or position indicator on the display 322, as will be described in future detail below.

Referring again to FIG. 1, in some embodiments, the handheld device 300 is also configured to send and receive voice communications such as mobile telephone calls. At least one key of the input device 650 is positioned adjacent to the navigation tool assembly 325, and each one of the at least one key includes a circular arc-shaped edge conformance fitting to a circular arc-shaped boundary about the navigation tool assembly 325. To facilitate telephone calls, the two call keys 605, 609 oppositely and laterally flank the navigation tool assembly 325. One of the two call keys is a call initiation key 605 and the other is a call termination key 609, although other key arrangements may be appropriate.

Although the keyboard 332 is shown as a reduced QWERTY keyboard, it is appreciated that alternate keyboard configurations may be suitable, such as a full QWERTY, QWERTZ, AZERTY or Dvorak configuration, as known in the art.

Figure 3:
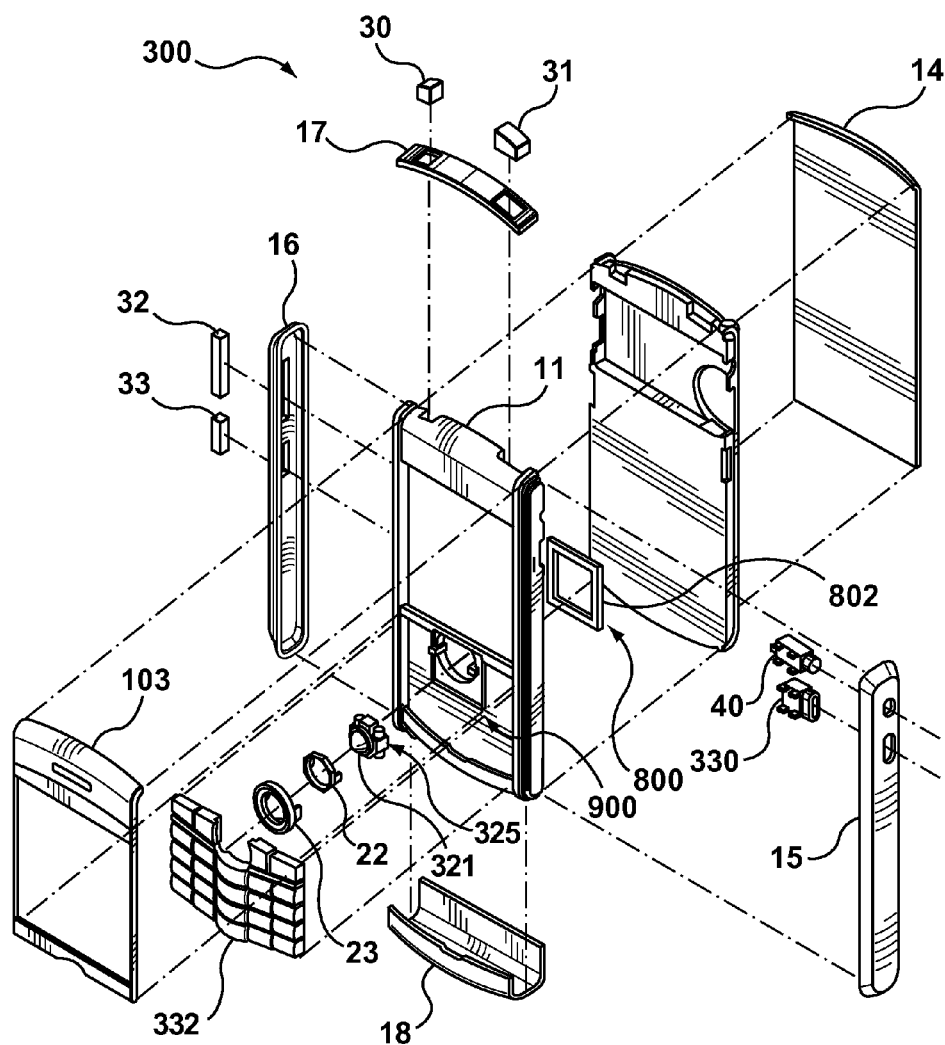
FIG. 3 is an exploded perspective view of an exemplary handheld electronic device, incorporating a trackball as the auxiliary input.

FIG. 3 illustrates some of the typical components found in the assembly of some embodiments of the handheld electronic device 300. The internal components are constructed on a PCB 102 ("printed circuit board"). A support frame 11 is provided and holds the keyboard 332 in place above the PCB 102. In some embodiments, the support frame 11 acts as a support structure that also holds the navigation tool assembly 325 in place above the PCB 102. The support frame 11 also provides an attachment point for the display 322 (not shown). A lens 103 covers the display 322 to prevent damage. When assembled, the support frame 11 and the PCB 102 are fixedly attached to each other and the display 322 is positioned between the PCB 12 and support frame 11. In some embodiments, a serial port (preferably a Universal Serial Bus port) 330 and an earphone jack 40 are fixably attached to the PCB 102 and further held in place by right side element 15. Buttons 30-33 are attached to switches (not shown), which are connected to the PCB 102 and are held in place by left side element 16 and top side element 17. Backplate 14 and bottom side element 18 are connected to the support frame 11 to complete the housing which holds the components together. The handheld electronic device 300 further includes a microprocessor 338 (FIG. 2) that is adapted to receive user commands from the keys and the navigation tool assembly 325 and to effect corresponding changes to the display.

The block diagram of FIG. 2 representing the device 300 interacting in the communication network 319 shows the device's inclusion of the microprocessor 338 which controls the operation of the device 300. A communication subsystem 311 performs communication transmission and reception with the wireless network 319. The microprocessor 338 further connects with an auxiliary input/output (I/O) subsystem 328 (e.g., the navigation tool assembly 325 including, for example, a trackball 321 or a thumbwheel), the serial port (preferably a Universal Serial Bus port) 330, the display 322, the keyboard 332, a speaker 334, a microphone 336, random access memory (RAM) 326, and flash memory 324. Other communications subsystems 340 and other device subsystems 342 are generally indicated as connected to the microprocessor 338 as well. An example of a communication subsystem 340 is a short-range communication subsystem such as BLUETOOTH® communication module or a Wi-Fi communication module (a communication module in compliance with IEEE 802.11b) and associated circuits and components. Additionally, the microprocessor 338 is able to perform operating system functions and preferably enables execution of software applications on the handheld electronic device 300.

The included auxiliary I/O subsystem 328 can take the form of a variety of different navigation tools (multidirectional or single directional) such as the navigation tool assembly 325 including the trackball 321, a thumbwheel, a navigation pad, or a joystick, just as examples. These navigation tools are located on the front surface of the device 300 but may be located on any exterior surface of the device 300. Other auxiliary I/O devices can include external display devices and externally connected keyboards (not shown). While the above examples have been provided in relation to the auxiliary I/O subsystem 328, other subsystems capable of providing input or receiving output from the handheld electronic device 300 are considered within the scope of this disclosure. Additionally, other keys may be placed along the side of the device 300 to function as escape keys, volume control keys, scrolling keys, power switches, or user programmable keys, and may likewise be programmed accordingly.

In some embodiments, the handheld electronic device 300 is designed to wirelessly connect with the communication network 319. Some communication networks that the handheld electronic device 300 may be designed to operate on require a subscriber identity module (SIM) or removable user identity module (RUIM). Thus, a device 300 intended to operate on such a system will include SIM/RUIM interface 344 into which a SIM/RUIM card (not shown) may be placed. The SIM/RUIM interface 344 can be one in which the SIM/RUIM card is inserted and ejected.

In some embodiments, the flash memory 324 is enabled to provide a storage location for the operating system, device programs, and data. While the operating system in some embodiments is stored in flash memory 324, the operating system in other embodiments is stored in read-only memory (ROM) or similar storage element (not shown).

Furthermore, the device 300 is equipped with components to enable operation of various programs, as shown in FIG. 2. In some embodiments, the flash memory 324 is enabled to provide a storage location for the operating system, device programs 358, and data. The operating system is generally configured to manage additional application programs that may also be referred to as device programs 358, which are also stored in memory 324 and executable on the processor 338. The operating system honors requests for services made by device programs 358 through predefined device program interfaces. More specifically, the operating system typically: determines the order in which multiple device programs 358 are executed on the processor 338 and the execution time allotted for each device program, manages the sharing of memory 324 among multiple device programs, handles input and output to and from other device subsystems 342, and so on. In addition, users can typically interact directly with the operating system through a user interface usually including the keyboard 332 and display screen 322. While the operating system in some embodiments is stored in the flash memory 324, the operation in other embodiments is stored in read-only memory (ROM) or similar storage element (not shown). As those skilled in the art will appreciate, the operating system, device application 358 or parts thereof may be loaded in RAM 326 or other volatile memory.

In some embodiments, the flash memory 324 includes device programs 358 for execution on the device 300 including an address book 352, a personal information manager (PIM) 354, and the device state 350. Furthermore, device programs 358 and other information 356 including data can be segregated upon storage in the flash memory 324 of the device 300.

When the device 300 is enabled for two-way communication within the wireless communication network 319, it can send and receive signals from a mobile communication service. Examples of communication systems enabled for two-way communication include, but are not limited to, the GPRS (General Packet Radio Service) network, the UMTS (Universal Mobile Telecommunication Service) network, the EDGE (Enhanced Data for Global Evolution) network, and the CDW (Code Division Multiple Access) network and those networks, generally described as packet-switched, narrowband, data-only technologies which are mainly used for short burst wireless data transfer. For the systems listed above, the handheld electronic device 300 must be properly enabled to transmit and receive signals from the communication network 319. Other systems may not require such identifying information. GPRS, UMTS, and EDGE require the use of a SIM (Subscriber Identity Module) in order to allow communication with the communication network 319. Likewise, most CDMA systems require the use of a RUIM (Removable Identity Module) in order to communicate with the CDMA network. The RUIM and SIM card can be used in multiple different handheld electronic devices 300. The handheld electronic device 300 may be able to operate some features without a SIM/RUIM card, but it will not be able to communicate with the network 319. The SIM/RUIM interface 344 located within the device 300 allows for removal or insertion of the SIM/RUIM card (not shown). The SIM/RUIM card features memory and holds key configurations 351, and other information 353 such as identification and subscriber related information. With a properly enabled handheld electronic device 300, two-way communication between the handheld electronic device 300 and communication network 319 is possible.

If the handheld electronic device 300 is enabled as described above or the communication network 319 does not require such enablement, the two-way communication enabled device 300 is able to both transmit and receive information from the communication network 319. The transfer of communication can be from the device 300 or to the device. In order to communicate with the communication network 319, the device 300 in some embodiments is equipped with an integral or internal antenna 318 for transmitting signals to the communication network. Likewise the handheld electronic device 300 in some embodiments is equipped with another antenna 316 for receiving communication from the communication network 319. These antennae 316, 318 in other embodiments are combined into a single antenna (not shown). As one skilled in the art would appreciate, the antenna or antennae 316, 318 in other embodiments are externally mounted on the device 300.

When equipped for two-way communication, the handheld electronic device 300 features the communication subsystem 311. As is well known in the art, this communication subsystem 311 is modified so that it can support the operational needs of the device 300. The subsystem 311 includes a transmitter 314 and receiver 312 including the associated antenna or antennae (316, 318) as described above, local oscillators (LOs) 313, and a processing module 320 which, in some embodiments, is a digital signal processor (DSP) 320.

It is contemplated that communication by the device 300 with the wireless network 319 can be any type of communication that both the wireless network and device are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the network 319.

Figure 4:
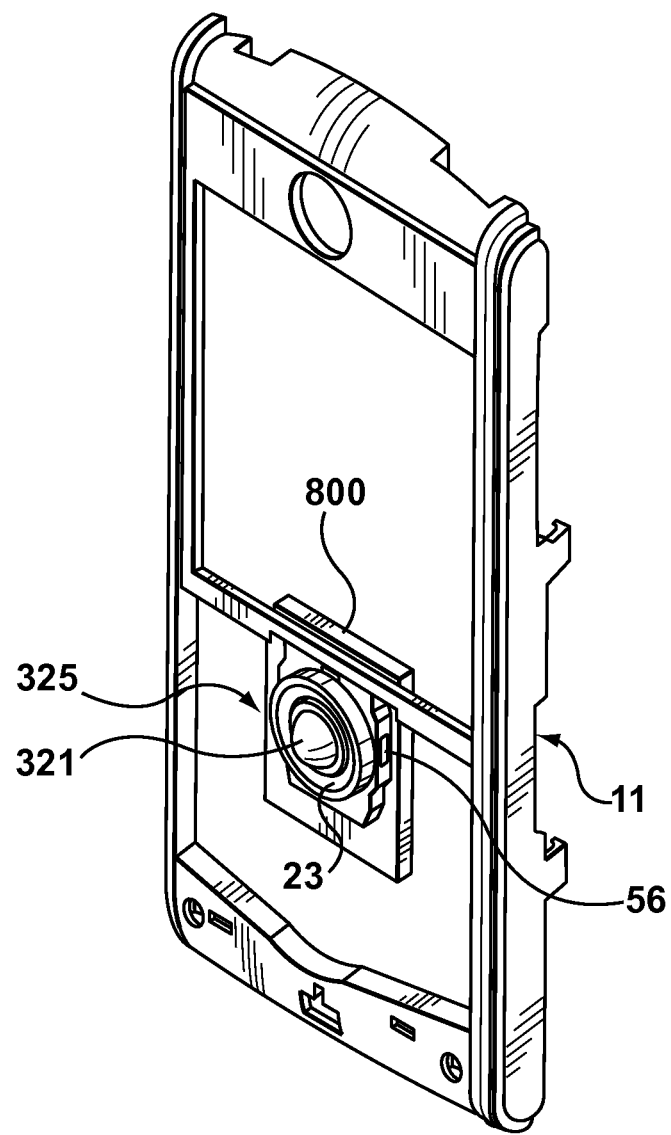
FIG. 4 is a detail view of the support frame of the handheld electronic device of FIG. 1.

Referring to FIGS. 1, 3 and 4, in one aspect, there is provided the handheld electronic device 300 including the support frame 11, the navigation tool assembly 325, and a coil 802. Although similar rotatable navigation tools may be appropriate, the navigation tool assembly 325 is coupled to the support frame 11 and includes the trackball 321, which is moveable relative to the support frame 11. The coil 802 is coupled to the support frame 11. Movement of the trackball 321 relative to the support frame 11 induces current through the coil 802. For example, the movement which effects induction is a rotational movement. The trackball 321, for example, has a diameter of approximately 5.5 millimetres, although alternate diameters may be appropriate to suit the application. In some embodiments, the trackball 321 is made from a plastic material, although other materials are contemplated.

The coil 802 can be mounted to a coil assembly 800 which is integrated within the support frame 11, as will be explained in further detail below. The coil 802 is electrically coupled to components provided in the handheld electronic device 300 and, in this respect, the inductive effect generated by the moving trackball 321 functions as a power supply for components of the handheld electronic device. In some embodiments, the generated inductive effect provides a source of power for recharging a battery (not shown) provided on the handheld electronic device 300. In this respect, in some embodiments the handheld electronic device 300 includes a battery, and the induced current is provided to recharge the battery. Such a configuration can aid in reducing the frequency with which the battery needs to be recharged (i.e., by using a cord to plug the device 300 into an outlet) or replaced.

Figure 5:
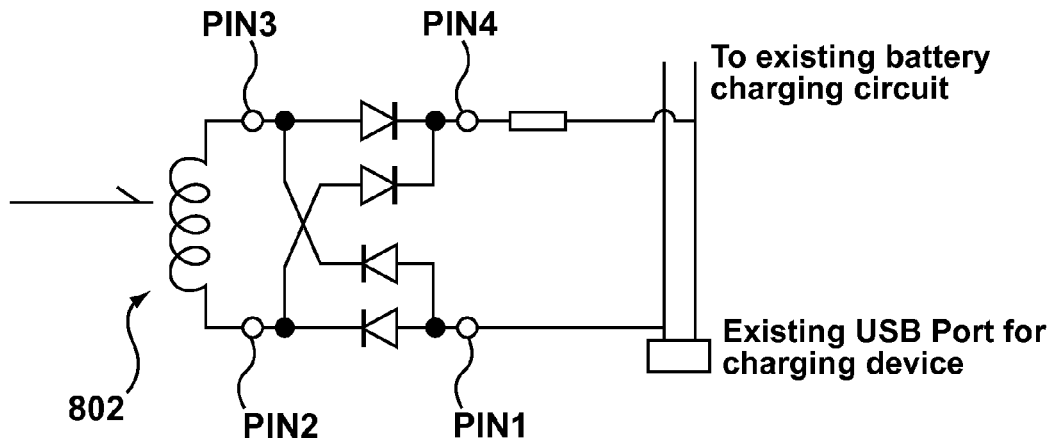
FIG. 5 is an electrical schematic diagram of a charging circuit of the handheld electronic device illustrated in FIG. 1.

FIG. 5 illustrates an exemplary charging circuit. The charging circuit uses a rectifier comprised of the diodes shown in FIG. 5 to ensure output from the coil 802 is direct current, and the charging circuit is connected to the existing circuit between the battery and the mini USB port using pins 1 and 4. Specifically, FIG. 5 shows a full-wave rectifier comprising four diodes that converts the whole of the input waveform (e.g., supplied at pins 2 and 3) to one of constant polarity at its output (e.g., pins 1 and 4). Full-wave rectification converts both polarities of the input waveform to DC (direct current), such that when the AC input supplied between pins 2 and 3 is positive, the cycle is conducted through pins 3 and 4 (and the diode contained therebetween) and when the AC input supplied between pins 2 and 3 is negative, the cycle is conducted through pins 2 and 4 (and the diode contained therebetween). The result is a full-wave rectified signal between pins 1 and 4, with pin 1 being ground.

Although other configurations may be suitable, the coil 802 can include a plurality of windings, and more specifically can include at least ten (10) windings. As a further example, the coil 802 can include twenty (20) windings, although the coil 802 is not limited to either of these examples and can have fewer or more windings. With further respect to the coil 802, for example, the coil is made from copper wire, although it is recognized that alternate materials with similar properties may be appropriate.

Figure 6:
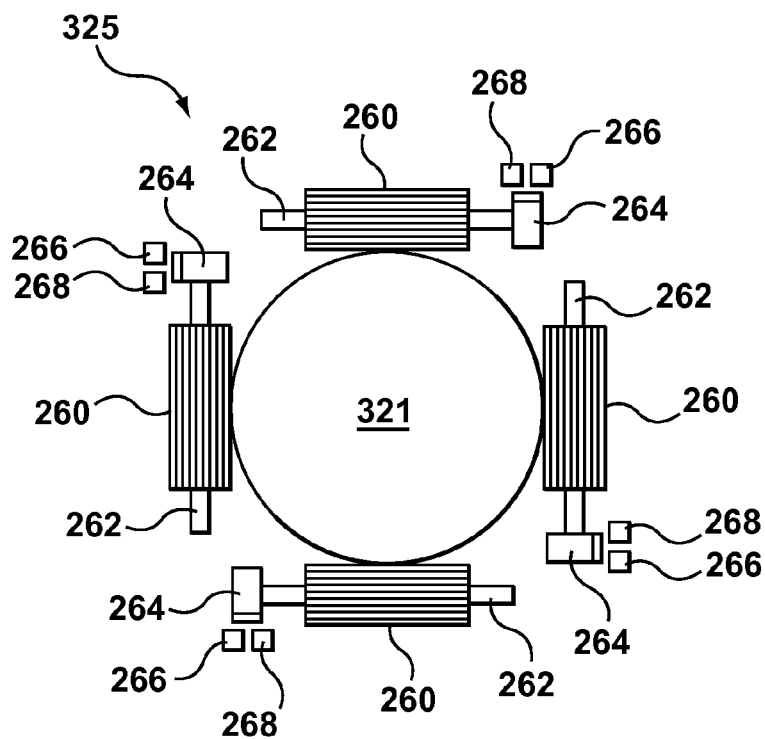
FIG. 6 is a schematic view of a navigation tool assembly of an embodiment of a handheld electronic device.
Figure 7:
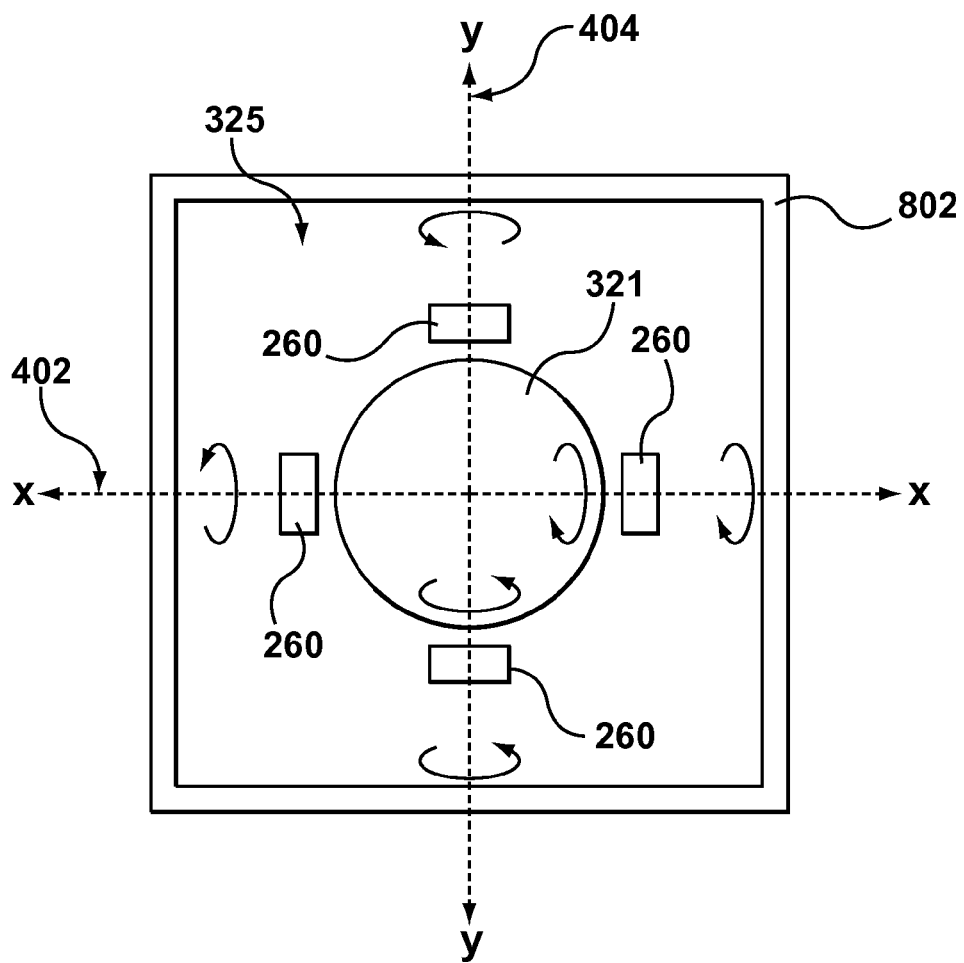
FIG. 7 is a schematic representation of a navigation tool in the form of a trackball.

In some embodiments, as shown in FIGS. 6 and 7, the navigation tool assembly 325 includes the trackball 321, which is supported to rotate in a plurality of directions, i.e., about an X-axis 402, a Y-axis 404, and combinations thereof. As shown in FIGS. 6 and 7, the navigation tool assembly 325 further includes at least one roller sensor 260, each one of the at least one roller sensor configured to bear frictionally against a surface of the trackball 321 and rotate about their own respective axles 262. Thus, rotation of the trackball 321 in any direction other than about an axis perfectly perpendicular to a one of the axles 262 will effect rotation of a respective one of the roller sensors 260. Each axle 262 has a permanent roller magnet 264 at an end thereof, which roller magnet rotates with the roller sensor 260 when the trackball 321 rotates. The roller magnet 264 can have a length of 1.5 millimetres, an outer diameter of 1.5 millimetres, and can be 0.5 millimetres thick, although other dimensions may be suitable. A Hall Effect sensor 266 is located near each roller magnet 264 and senses rotation of the roller magnet 264, hence rotation of the associated roller sensor 260, and therefore rotation of the trackball 321. Rotation of any one or any combination of the roller magnets 264 induces current through the coil 802.

As described above, the trackball 321 is configured to bear or urge against at least one of the at least one roller sensor 260 and effect rotational movement of at least one roller sensor 260 when the trackball 321 moves relative to the support frame 11. The induction of current through the coil 802 is caused by rotational movement of at least one of the at least one roller sensor 260 which is effected by the urging of the trackball 321 against the at least one roller sensor 260 whose rotational movement is being effected. Specifically, when the user rotates the trackball 321 relative to the support frame 11, the trackball urges against one or more of the roller sensors 260, causing the roller sensor to rotate. The rotation of the roller sensor 260 causes rotation of the corresponding roller magnet 264, inducing current through the coil 802. Since the coil 802 is in communication with the internal components of the device 300, such as the battery (not shown), the current that is induced through the coil can cause the battery to be recharged, increasing battery life of the device 300 and enabling the user to operate the device for longer periods of time without the need to plug the device in for recharging purposes. For example, in this case and as known to those of ordinary skill in the art, movement of the roller magnets 264 of the navigation tool assembly 325 in relation to the coil 802 induces a current and/or voltage in the coil, where the induction of current and/or voltage is greater than a deminimus value, as known to those of ordinary skill in the art.

With respect to the rotation sensed by the Hall Effect sensor 266, a corresponding signal is transmitted from the Hall Effect sensor to the microprocessor 338 based upon the sensed rotation, and the microprocessor effects movement of the selection or position indicator on the display 322. In those embodiments where the trackball 321 is made from magnetic material or includes magnetic material, the software of the microprocessor which effects the movement of the selection or position indicator on the display 322 based on information from the Hall Effect sensor 266 is configured to account for the magnetic field generated by the trackball 321.

In some embodiments, the trackball 321 further functions as a depressible selection tool that is configured to, upon depression, send data indicative thereof to the microprocessor 338, and which is further programmed to take a particular action depending on which data item is cursor-designated when the depression occurs. For example, the depression of the trackball 321 may function as a selection tool, wherein the item that is designated by the cursor is selected for further processing.

Figure 8:
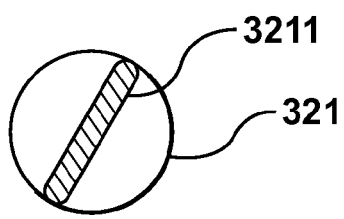
FIG. 8 is a sectional drawing of a trackball of a navigation tool assembly of another embodiment of a handheld electronic device.

In some embodiments and as shown in FIG. 8, the trackball 321 can include a magnet 3211. For example, the magnet 3211 can be a permanent magnet, such as a Neodymium magnet, although it is recognized that alternative magnets may be suitable. In this respect, for example, the magnet 3211 is disposed along an axis of the trackball 321. For example, the magnet 3211 is fitted within a hole drilled within the trackball 321. In this respect, for example, the trackball movement which effects induction of current through the coil 802 includes movement of the trackball 321 through the coil 802 such that a changing magnetic field created by movement of the trackball 321 effects the coil 802 to induce a voltage and/or current in the coil 802.

Further, in some embodiments, the movement of the trackball 321 includes movement of the trackball from a first position to a second position, wherein in the first position, the trackball generates a first magnetic field, and wherein in the second position, the trackball generates a second magnetic field, wherein the first magnetic field is different relative to the second magnetic field. In some embodiments, the movement of the trackball 321 from the first position to the second position induces a current through the coil 802 because of effects in changing magnetic flux applied across the surface of the coil 802. While a first position and a second position are described, the intent is to convey that the trackball 321 is moving or changing position and it is the movement of the magnet 3211 that creates a changing magnetic field or magnetic flux that induces the current through the coil 802. In other words, the first position and second position may be any position so long as they are not the same and without movement of the magnet 3211.

Figure 10:
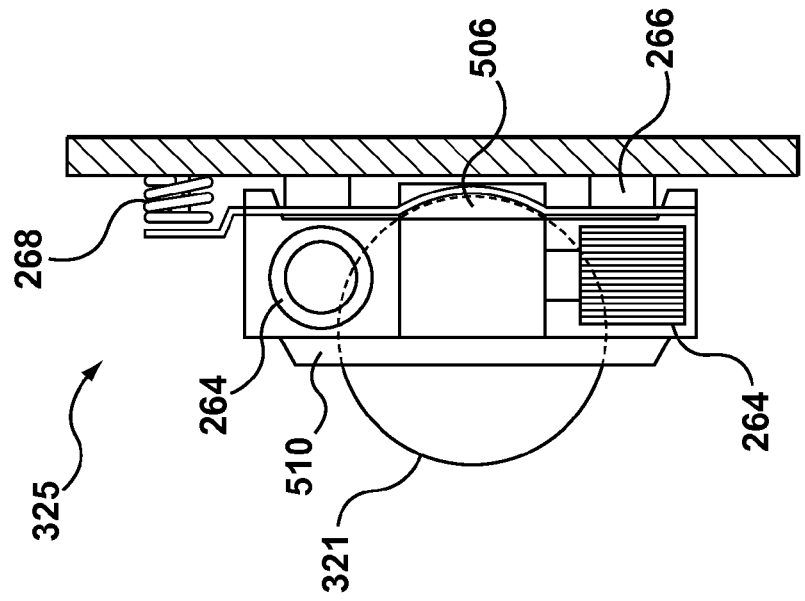
FIG. 10 is a side view of the navigation tool assembly shown in FIG. 12.
Figure 9:
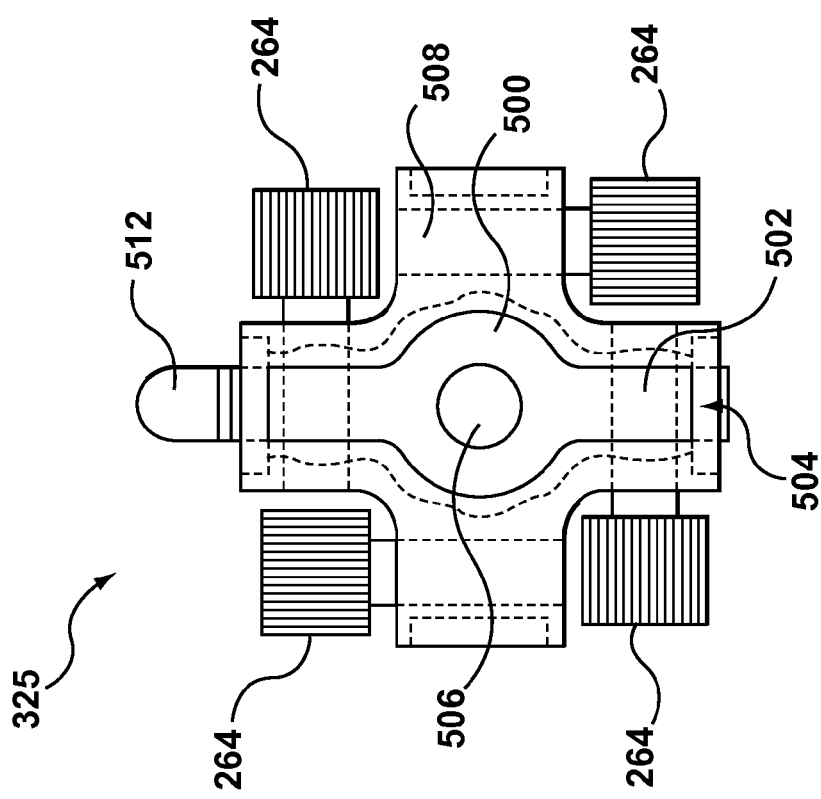
FIG. 9 is a plan view of the navigation tool assembly of FIG. 11.

Referring now to FIGS. 9 and 10, the navigation tool assembly 325 is described in further detail. Specifically, in some embodiments, the trackball 321 is electromagnetically caused to be retarded from rotating by being "pressed" slightly between its rotational support cradle 500 and a locking ring 22 (described in further detail below). The navigation tool assembly 325 shown in FIGS. 9 and 10 includes the generally elongated support cradle 500 which is made, for example, from spring steel, although other materials with similar properties may be suitable. The support cradle 500 is cantilever fixed at one end 502 via a hinge member 504 and is otherwise free to flex up or down relative to the hinge member 504. The support cradle 500 further includes a cup-shaped depression 506 in which the trackball 321 is seated. A cross shaped frame 508 with a substantially central hole (not visible) and the locking ring 22 surrounding the central hole fits down over the trackball 321 to retain the trackball 321 in position. With this configuration, which is generally as known in the art, the trackball 321 is free to rotate, and it may be depressed slightly against the spring bias of the support cradle 500 to activate a button (not shown) located beneath the trackball 321 to indicate a user input. An end of the support cradle 500 that is opposite the hinge member 504 extends slightly past the frame 508 to form a tongue 512. In the illustrated embodiment, an electromagnet 268, such as a T-coil, is located below the tongue 512, and the tongue 512 has a magnet or magnetic coating (not shown) thereon so that when the electromagnet 268 is energized, the tongue 512 is pushed away from the electromagnet 268. Alternatively, the electromagnet 268 can be positioned on the opposite side of the tongue 512 and the support cradle 500 can be made from magnetically attractable material such that when the electromagnet 268 is activated, the tongue 512 is pulled toward the electromagnet 268. In either configuration, when the electromagnet 268 is energized, the trackball 321 is pressed more firmly against a collar 510 surrounding the trackball 321, which causes increased drag and hence retards rotation of the ball 321. A piezoelectric member could be used in place of the electromagnet 268 to electromechanically induce drag on the trackball 321 instead, as known in the art.

Figure 11:
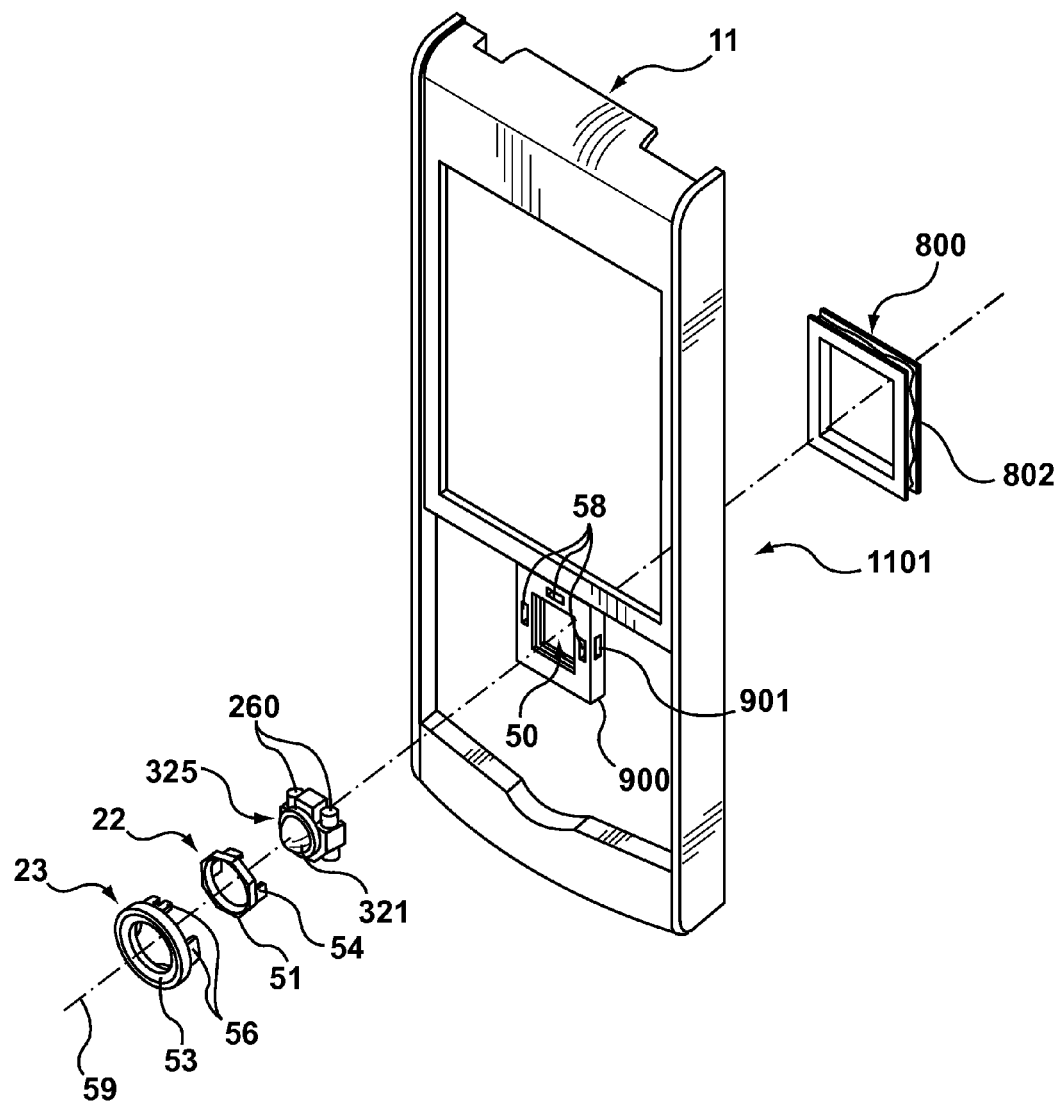
FIG. 11 is an exploded view of the retaining clips, navigation tool assembly and support frame of the handheld electronic device of FIG. 1.

FIGS. 3, 4 and 11 illustrate the incorporation of the navigation tool assembly 325 with the support frame 11, for some embodiments of the handheld electronic device 300. However, it is recognized that the navigation tool assembly 325 can be attached to the device 300 in numerous other manners, as known by those skilled in the art. The navigation tool assembly 325 is frictionally coupled to the support frame 11. The support frame 11 includes a navigation tool assembly mounting frame 900 for mounting the navigation tool assembly 325. The navigation tool assembly 325 is locked into position within a cavity 50 defined by the navigation tool assembly mounting frame 900. The cavity 50 is positioned between the display screen 322 and the keyboard 332, and is substantially cylindrical in shape. Other cavity orientations can also be utilized. The navigation tool assembly mounting frame 900 includes a plurality of ports 58 that, in conjunction with an inner locking ring 22, an outer locking ring 23, and the cavity 50 are used to securely affix the navigation tool assembly 325 to the support frame 11. The inner and outer locking rings 22, 23 can be color coded with respect to each other in order to encourage proper placement and orientation with respect to the trackball 321 and the assembly 325.

In some embodiments, the inner locking ring 22 can be described as a ball retaining clip. This ball retaining clip 22 comprises a ball retaining ring 51 and a plurality of fixing feet 54 extending from the ball retaining ring 51 and arranged in opposing pairs. The fixing feet 54 secure the clip 22 to the navigation tool assembly 325 such that the ring 51 becomes positioned over the trackball 321 in a retaining relationship whereby the trackball is retained within the navigation tool assembly 325 but is permitted to rotate. Each of the plurality of fixing feet 54 extends in a direction parallel to the longitudinal axis of the navigation tool assembly 325 and clips onto the surface of the navigation tool assembly 325. In some embodiments, there is provided one pair of opposing fixing feet 54, each of which include an aperture which snaps over a projection (not shown) provided on the navigation tool assembly 325, and there is also provided a second pair of opposing fixing feet 54, each of which clip over the base of the navigation tool assembly 325. The longitudinal axis as described herein refers to the assembly line 59. The inner locking ring 22 holds the trackball 321 in place, but allows rotation of the trackball 321. The inner locking ring 22 also permits the trackball 321 to be removed from the incorporating device 300 for replacement or servicing.

The outer locking ring 23 can be described as a navigation tool assembly retaining clip for releasably retaining the navigation tool assembly 325 in the cavity 50. The navigation tool assembly clip 23 comprises a navigation tool assembly retaining ring 53 and a plurality of double pronged clips 56 extending from the retaining ring 53 in a direction parallel to the longitudinal axis 59 of the navigation tool assembly 325. The lower portion of the clips 56 releasably clip into ports 58 provided in the navigation tool assembly mounting frame 900 to secure the navigation tool assembly 325 to the frame 11.

The above-described arrangement is such that removal of the navigation tool assembly 325 is allowed when the clips 56 are removed from engaging the ports 58 of the frame 900. To remove the navigation tool assembly 325 from the cavity 50, force is applied to the clips 56 so that the clips 56 no longer frictionally engage or snap engage the frame 900. Once the engagement of the clips 56 is eliminated, the assembly 325 can be removed by axially sliding the navigation tool assembly 325 out of the cavity 50. Removal may describe in some instances when the assembly 325 becomes damaged or the user desires replacement with a different type of assembly 325.

Figure 13:
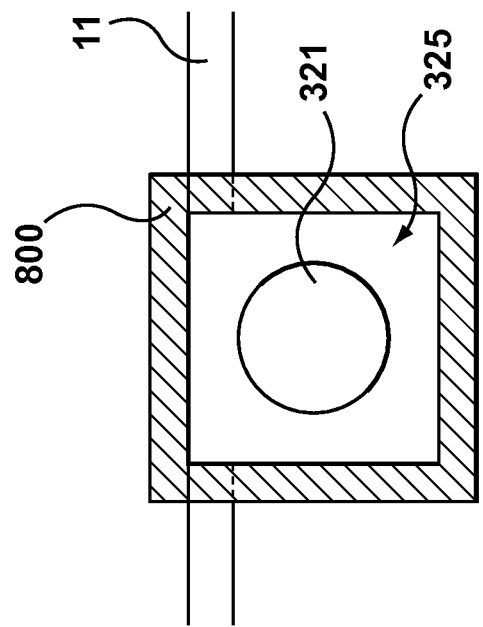
FIG. 13 is a fragmentary sectional rear view of the handheld electronic device of FIG. 1, illustrating the positional relationship between the navigation tool assembly, the coil assembly, and the navigation tool assembly mounting frame.
Figure 12:
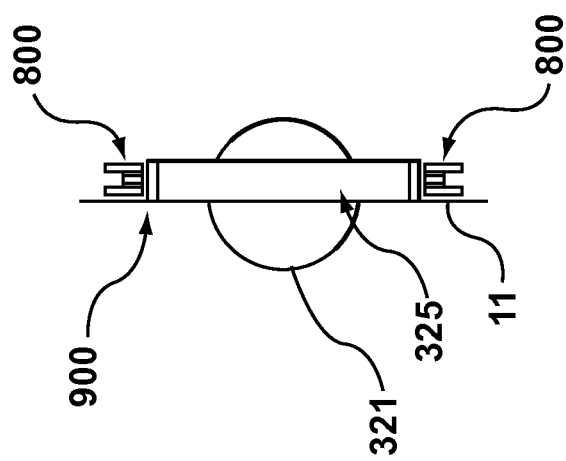
FIG. 12 is a fragmentary sectional side view of the handheld electronic device of FIG. 1, illustrating the positional relationship between the navigation tool assembly, the coil assembly, and the navigation tool assembly mounting frame.
Figure 15:
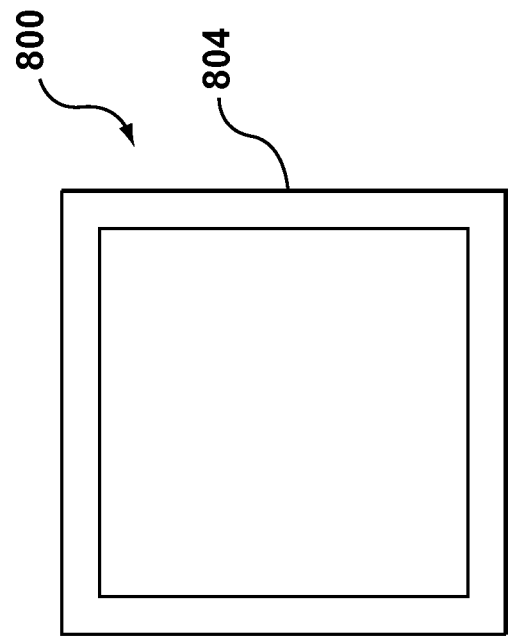
FIG. 15 is a front view of the coil assembly of the handheld electronic device of FIG. 1.
Figure 14:
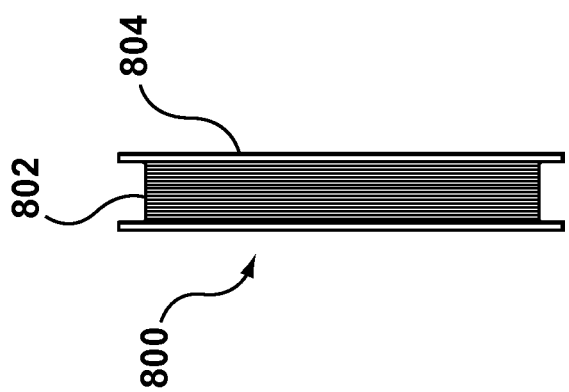
FIG. 14 is a side view of a coil assembly of the handheld electronic device of FIG. 1.

Referring now to FIGS. 12-15, in some embodiments, the coil 802 is provided as part of the coil assembly 800. The coil assembly 800 includes a coil mounting 804, and the coil 802 is mounted within a groove provided within the coil mounting 804. Integration of the coil assembly 800 with the support frame 11 is effected from a rear 1101 (FIG. 11) of the support frame 11. The coil assembly 800 snap fits over the navigation tool assembly mounting frame 900 of the support frame 11 and is received within a groove 802 provided in the navigation tool assembly mounting frame 900. FIGS. 11, 12, and 13 illustrate the positional relationship between the navigation tool assembly 325, the coil assembly 800, and the navigation tool assembly mounting frame 900, when each of the navigation tool assembly 325 and the coil assembly 800 is mounted to the navigation tool assembly mounting frame 900.

In some embodiments, and referring to FIGS. 16 to 22, the support structure is the PCB 102, the navigation tool assembly 325 is mounted to the PCB, and the coil assembly 800 is mounted to the navigation tool assembly. This allows for a reduction in the total depth of the device 300, as will be described in further detail below. However, as indicated above, the attachment of the navigation tool assembly 325 and the coil assembly 800 to the device 300 is not limited to the manners described in this disclosure, as known in the art.

A socket 3002 is provided for mounting the navigation tool assembly 325. The PCB 102 is provided with a through hole or a recess for accommodating passage of a portion of the socket 3002 therethrough. In order to accommodate the positioning of the socket 3002 and associated trackball 321 in the recess, the socket is configured as presented below. The coil mounting 804 of the coil assembly 800 snap fits directly onto a surface of the socket 3002. For example, and referring to FIG. 22 the coil mounting 804 is held in place to the socket 3002 by four (4) projections 8042 (two (2) are shown) which snap fit into recesses or gaps provided in the socket 3002. However, it is appreciated that fewer or more than four projections 8042 may be possible.

Figure 16:
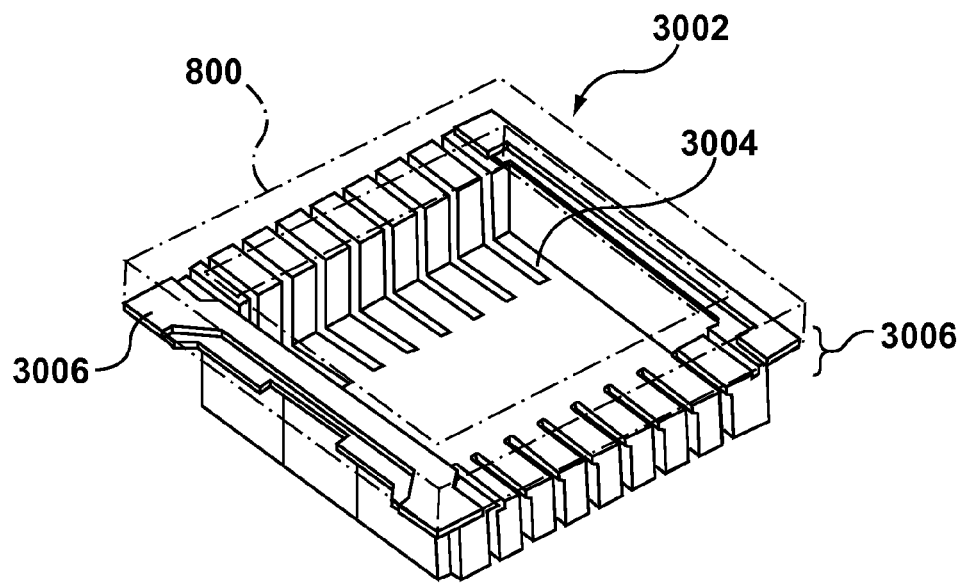
FIG. 16 depicts an embodiment of a socket for mounting the navigation tool assembly on a printed circuit board.
Figure 17:
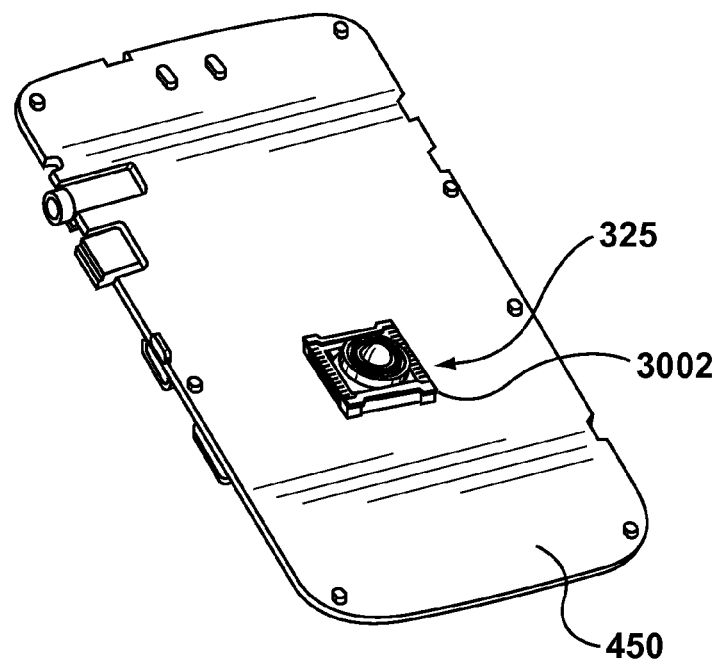
FIG. 17 illustrates the printed circuit board having the navigation tool assembly mounted within the socket of FIG. 16 which is correspondingly mounted through the printed circuit board.
Figure 18:
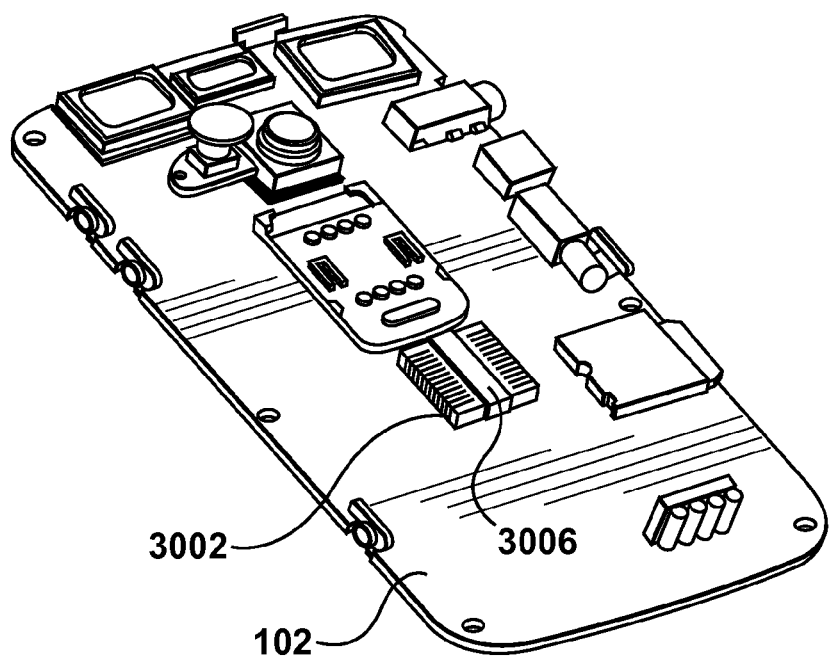
FIG. 18 illustrates a bottom side of the navigation tool assembly within the socket of FIG. 16.

In a first embodiment, as illustrated in FIGS. 16 and 17, the socket 3002 includes biased electrical interconnectors 3004 for connecting the trackball assembly 325 to the PCB 102. The electrical interconnectors 3004 allow for the trackball assembly 325 device programs 358 to be in signal communication with the microprocessor 338 of the handheld electronic device 300. As briefly described above, the socket 3002 can be mounted in the through hole or recess in the PCB 102. The recess accommodates the passage of at least a portion of the socket 3002 therethrough. Additionally, the trackball assembly 325 and the coil assembly 800 can be mounted once the socket 3002 is in the installed position. In order to provide additional support, the socket 3002 can be provided with stiffeners 3006. In at least one embodiment, the stiffeners 405 are metal. In another embodiment, the stiffeners 3006 are a stiff plastic, although other materials with similar properties are contemplated. The back side of the PCB 102 with a protruding socket 3002 is illustrated in FIG. 18. While the socket 3002 is illustrated as protruding beyond the PCB 102 surface, in other embodiments, the recess may not extend all the way through the PCB (not shown).

Figure 19:
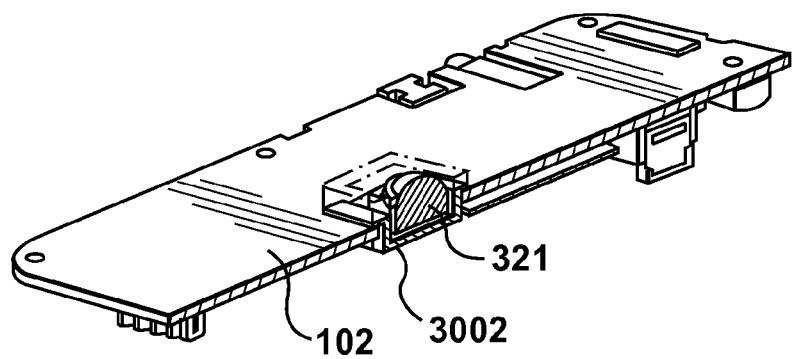
FIG. 19 illustrates a cross-sectional view of the navigation tool assembly within the socket of FIG. 16.

As shown in FIG. 19, a cross-sectional view illustrates the trackball assembly 325 and the coil assembly 800 mounted within the socket 3002. The socket 3002 has been mounted within the through hole or recess in the PCB 102. The cross-sectional view illustrates that by mounting socket 3002 within the through hole or recess in the PCB 102, a thinner handheld electronic device 300 may be constructed. The socket 3002 may be connected to the PCB 102 by soldering the socket 3002 to the PCB 102. Additionally, the socket 3002 facilitates the signal communication between the trackball assembly 325 and microprocessor 338. Further still, the PCB 102 can be configured to allow additional signal communication between other components mounted thereon.

Figure 20:
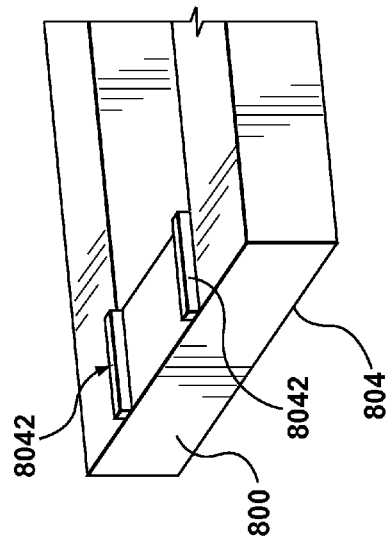
FIG. 20 depicts the navigation tool assembly mounted within the socket of FIG. 16.

FIG. 20 depicts the trackball assembly 325 mounted within the socket 3002. The trackball assembly 325 is seated within the socket 3002 and retained therein with a metal retaining clip (not shown). As shown, biased electrical interconnector 3004 connects socket 3002 with an under side of trackball assembly 325. The biased electrical interconnector 3004 also may establish biased electrical contact with a corresponding electrical contact (not shown) on the PCB 102 when the socket 3002 is installed in the recess thereof.

The biased electrical interconnectors 3004 can be made of any electrically conductive material. For example, the biased electrical interconnectors 3004 can be made predominantly of copper.

Figure 21:
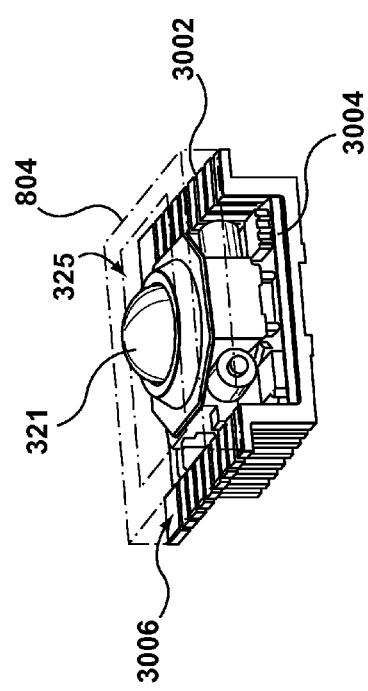
FIG. 21 depicts another embodiment of a socket for mounting the navigation tool assembly on the printed circuit board according to present disclosure.
Figure 22:
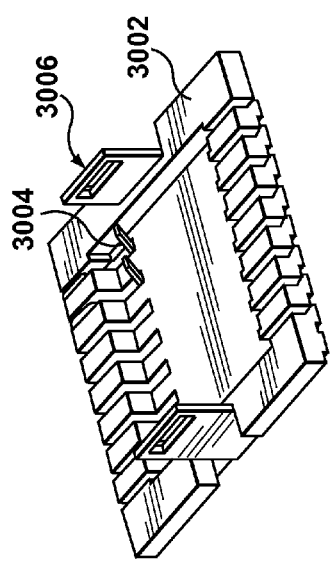
FIG. 22 is a fragmentary view of a coil assembly for use with either of the sockets illustrated in FIG. 16 or FIG. 21.

FIG. 21 depicts another embodiment of the socket 3002 for mounting the trackball assembly 325 on the PCB 102. The socket 3002 includes biased electrical interconnectors 3004 for connecting to the trackball assembly 325. The stiffener 3006 can be constructed of metal and defines cutouts to accommodate mounting of additional components on the socket 3002. Alternatively, the cutouts can accommodate a portion of the housing or keypad and thus provide for further securement of the socket 3002 within the device 300.

In the above description, for purposes of explanation, numerous details are set forth in order to provide a thorough understanding of the present disclosure. However, it will be apparent to one skilled in the art that these specific details are not required in order to practice the present disclosure. In other instances, well-known electrical structures and circuits are shown in block diagram form in order not to obscure the present disclosure. Although certain dimensions and materials are described for implementing the disclosed example embodiments, other suitable dimensions and/or materials may be used within the scope of this disclosure. All such modifications and variations, including all suitable current and future changes in technology, are believed to be within the sphere and scope of the present disclosure. All references mentioned are hereby incorporated by reference in their entirety.

I claim:

1. An electronic device comprising:
    a navigation tool assembly coupled to a support structure and including a navigation tool that is moveable relative to the support structure and at least two roller sensors, and each one of the at least two roller sensors including a roller magnet; and
    a coil coupled to the support structure and positioned in a periphery of the navigation tool, surrounding the roller sensors;
    the navigation tool configured to urge against at least one of the at least two roller sensors and cause rotational movement of the at least one roller sensor and the included roller magnet when the navigation tool moves relative to the support structure; and
    rotational movement of the at least one of the at least two roller sensors effects induction of current through the coil.

2. The electronic device as claimed in claim 1;
    wherein the coil includes a plurality of windings.

3. The electronic device as claimed in claim 2;
    wherein the coil is characterized by at least ten (10) windings.

4. The electronic device as claimed in claim 1;
    wherein the navigation tool includes a magnet.

5. The electronic device as claimed in claim 4;
    wherein the movement of the navigation tool includes movement of the navigation tool within an area surrounded by the coil.

6. The electronic device as claimed in claim 4;
    wherein the movement of the navigation tool includes movement of the navigation tool from a first position to a second position, wherein in the first position, the navigation tool generates a first magnetic field, and wherein in the second position, the navigation tool generates a second magnetic field, wherein the first magnetic field is different relative to the second magnetic field.

7. The electronic device as claimed in claim 4;
    wherein the movement of the navigation tool effects a change in a magnetic flux provided through a surface of the coil.

8. The electronic device as claimed in claim 7, further comprising:
    a component electrically coupled to the coil, wherein the component includes a battery to be charged by the current induced in the coil.

9. The electronic device as claimed in claim 1, further comprising:
    a display screen upon which information is displayed;
    wherein the movement of the navigation tool effects cursor movement on the display screen.

10. The electronic device as claimed in claim 1;
    wherein the movement of the navigation tool includes rotational movement of the navigation tool.

11. The electronic device as claimed in claim 1;
    wherein the navigation tool is a trackball which is moveable relative to the support structure.

12. The electronic device as claimed in claim 11;
    wherein the movement of the navigation tool includes rotational movement.

13. The electronic device as claimed in claim 11;
    wherein the trackball includes a magnet.

14. The electronic device as claimed in claim 1;
    wherein, for each one of the at least two roller sensors, the navigation tool assembly further includes a respective Hall Effect sensor which senses rotation of the respective roller magnet.

15. The electronic device as claimed in claim 1;
    wherein the coil is electrically coupled to a component of the electronic device to provide power to the component.

16. The electronic device as claimed in claim 15;
wherein the component includes a battery to be charged by the current induced in the coil.

17. A method comprising:

moving a navigation tool of an electronic device relative to a support structure of said device, the navigation tool being a part of a navigation tool assembly, the navigation tool assembly including at least two roller sensors, and each one of the at least two roller sensors including a roller magnet;

in response to said movement, the navigation tool urging against at least one of the at least two roller sensors and causing rotational movement of the at least one roller sensor and the included roller magnet when the navigation tool moves relative to the support structure, rotational movement of the at least one of roller sensor inducing current through a coil coupled to and positioned in a periphery of the navigation tool, the coil surrounding the roller sensors; and in response to said inducing, recharging a battery of said device.

18. The method as claimed in claim 17;
wherein the moving of the navigation tool includes movement of the navigation tool within an area surrounded by the coil.

19. The method as claimed in claim 17;
wherein the moving of the navigation tool includes movement of the navigation tool from a first position to a second position, wherein in the first position, the navigation tool generates a first magnetic field, and wherein in the second position, the navigation tool generates a second magnetic field, wherein the first magnetic field is different relative to the second magnetic field.

20. The method as claimed in claim 17;
wherein the moving of the navigation tool includes rotational movement of the navigation tool.

21. The method as claimed in claim 17;
wherein the moving of the navigation tool causes movement of a cursor on a display screen of the device.

* * * * *